Figure 1:
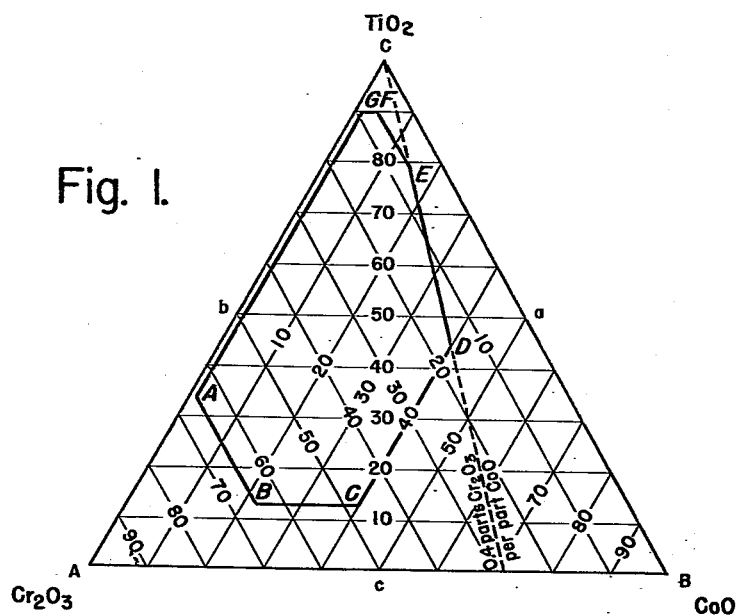

June 11, 1957 W. M. FOSS ET AL 2,795,511
COLORED PIGMENT FOR CAMOUFLAGE COATING COMPOSITIONS
Filed Sept. 9, 1952

INVENTORS
Warren M. Foss
Walter K. Nelson
BY
ATTORNEY

United States Patent Office 2,795,511
Patented June 11, 1957

2,795,511

COLORED PIGMENT FOR CAMOUFLAGE COATING COMPOSITIONS

Warren M. Foss, Nixon, and Walter K. Nelson, Metuchen, N. J., assignors to National Lead Company, New York, N. Y., a corporation of New Jersey Application September 9, 1952, Serial No. 308,662

1 Claim. (Cl. 106—299)

The present invention relates in general to pigment materials and more particularly to an improved colored pigment, and method for making the same, for use in camouflage coating compositions.

Earlier work in the field of camouflage paints has established what are now regarded as the primary requisites of a camouflage paint, namely, that it have a visually dark green color akin to that of natural foliage and that it possess the high infra-red reflectance value of natural foliage or more particularly chlorophyll which characterizes the infra-red reflectance value of natural green foliage.

Notable among early efforts to produce camouflage paints is the United States standard "Lusterless Olive Drab." While this camouflage paint has a visual color well suited for camouflaging military equipment, it has a low infra-red reflectance value and as a consequence stands out sharply against natural green foliage when photographed through the medium of infra-red photography. Other camouflage pigments have been made having good visual color and satisfactory infra-red reflectance values, but when used in a paint vehicle, have had no hiding power and poor resistance to weathering.

An object, therefore, of the present invention is to provide a superior green pigment which is economical to manufacture and which, when used in a paint vehicle, will form coating compositions having high hiding power.

Another object of the invention is to provide a superior green pigment having spectrophotometric characteristics substantially similar to chlorophyll.

A further object of the invention is to provide a superior camouflage coating composition having a dark green color akin to natural foliage and a high infra-red reflectance value.

A still further object of the invention is to provide an improved method for making a green pigment for use in camouflage paints.

These and other objects will become apparent from the following more complete description of the invention.

In its broadest aspects the present invention relates to the formation of a green pigment comprising a chemical and/or physical combination of the oxidic compounds of chromium, cobalt and titanium in such proportions that the spectrophotometric characteristics of the green pigment correspond substantially to those of chlorophyll; and which, when mixed with a paint vehicle, will provide a camouflage coating composition having high hiding power and good resistance to weathering.

With respect to the use hereinafter of the phrase "green pigment," it will be understood that the latter is used collectively to designate the plurality of green pigments which are included within the scope of the invention and which, as illustrated herein and hereinafter described, may be represented graphically by a family of spectrophotometric curves having substantially the characteristics of the spectrophotometric curve of chlorophyll.

More particularly, the invention contemplates the formation, initially, of an intimate mixture containing chromium sesquioxide, having the formula $Cr_2O_3$ and sometimes referred to hereinafter as chromium oxide; cobaltous oxide; and titanium dioxide wherein the oxides of chromium, cobalt and titanium are provided preferably in the form of an intimate mixture of chromic acid, cobalt acetate and a hydrous titanium oxide such as may be obtained by hydrolysis of titanium salt solutions, for example, titanium sulfate solutions; and thereafter calcining the mixture at a temperature of from about 650° C. to about 1075° C. and preferably from about 700° C. to 1000° C. for a period of from ½ hour to 2 hours. The calcination of the mixture results in a chemical and/or physical combination of the constituents to form a green pigment which, upon X-ray and microscopic analysis, appears to comprise mixed crystals of cobalt chromite, cobalt orthotitanate and titanium dioxide.

While the latter are probably the actual chemical compounds in the pigment, it will better serve the purpose of this description to refer to these chemical compounds, percentagewise, in terms of the percent by weight of the chromium oxide, cobaltous oxide and titanium dioxide contained in the green pigment.

The proportions of the oxidic compounds used in the preparation of the colored pigment of this invention may be varied over a considerable range and still be considered to fall within the scope of this invention.

In general, it has been discovered that when the number of parts (on a mol basis) of cobaltous oxide are equal to or less than the number of parts of chromium oxide, then for a constant amount of titanium dioxide such as, for example, 5 mols, the range of mols of cobaltous oxide and chromium oxide may be from 0.2 to 5 mols; and that when the mols of cobaltous oxide are greater than the mols of chromium oxide then:

(a) The mol ratio of cobaltous oxide and chromium oxide must be 5 or less and;

(b) The range of chromium oxide may be from 0.2 to 4.9 mols and the range of cobaltous oxide may be from 0.21 to 5 mols for each 5 mols of titanium dioxide.

Expressed on a weight basis, when the number of parts by weight of cobaltous oxide exceeds the number of parts by weight of chromium oxide, then for each part by weight of cobaltous oxide there must be from 0.4 to 2 parts by weight of chromium oxide.

From the above data and by reference to the diagram, it will be seen that green pigments of this invention, having the spectrophotometric characteristics of chlorophyll, comprise oxidic compounds of chromium, cobalt and titanium present in weight percents from:

6% to 65% $Cr_2O_3$
1% to 40% CoO
12% to 90% $TiO_2$ the chromium oxide being present in an amount of at least 0.4 part by weight for each part by weight of cobaltous oxide.

The drawing, Figure 1, represents a diagram wherein the hereinabove described ranges, expressed in percentages by weight of chromium oxide, cobaltous oxide, and titanium dioxide contained in the green pigment, are plotted on a trilinear diagram (triangular graph). Point #2 on the graph represents 100% chromium oxide, point #3 represents 100% cobaltous oxide and point #4 represents 100% titanium dioxide. Within these boundary lines of the trilinear diagram is a shaded area bounded by straight lines adjoining the points A, B, C, D, E, F and G, which points correspond respectively to the compositions listed below:

| Points | Parts by Weight | | |
|---|---|---|---|
| | Cr₂O₃ | CoO | TiO₂ |
| | Percent | Percent | Percent |
| A | 65 | 1 | 34 |
| B | 65 | 23 | 12 |
| C | 48 | 40 | 12 |
| D | 16 | 40 | 44 |
| E | 6 | 15 | 79 |
| F | 6 | 4 | 90 |
| G | 9 | 1 | 90 |

The shaded area within the diagram includes green pigments containing the oxides of chromium, cobalt and titanium in the proportions included within the scope of this invention and have been found to have tinting strengths ranging from 50 to 150. The latter values were determined according to the National Lead Company method as described in Gardiner's "Examination of Paints, Varnishes and Lacquers," 9th edition, 1939, page 35, except that the standard reference pigment is chrome green ($Cr_2O_3$), the "tinting" pigment is anatase titanium dioxide, the empirical tinting power value (T) of the standard chrome green being arbitrarily taken as 100.

The chromium oxide, cobaltous oxide and titanium dioxide contained in the green pigment may be incorporated in any convenient form. Although an intimate mixture of the oxidic compounds of chromium sesquioxide, cobalt sulfate and hydrous titanium oxide is preferred from a standpoint of ease of handling, availability and cost considerations, it will be understood that other oxidic compounds of chromium and cobalt may be used. For example, the sulfates, acetates, and chlorides of chromium and cobalt may be used in combination with the hydrate and, in fact, any compounds of chromium, cobalt and titanium may be used which, when heated during the calcination state, will give chromium oxide ($Cr_2O_3$), cobaltous oxide (CoO) and titanium dioxide ($TiO_2$). It is much to be preferred, however, to form an intimate mixture of the oxides of chromium, cobalt and titanium by forming an aqueous solution of chromic acid, cobalt acetate and anatase hydrate.

With respect to the source of titanium dioxide, a hydrous titanium oxide provides an aqueous medium which is ideal for forming a slurry of the oxidic compounds of titanium, chromium and cobalt. The hydrate may be treated by preliminary drying and heating to a temperature of from 600° C. to 700° C. to remove the sulfate, but tests have indicated that the removal of sulfate is not essential to the production of a satisfactory green pigment, and hence for reasons of economy, the hydrate may be used in an untreated state.

After the mixture of materials has been thoroughly agitated, the slurry is then partially dried and then transferred directly to a continuous rotary kiln in which the first portion of the kiln will act as a drier and the subsequent portion of the kiln as a calciner. The dried material is calcined at a temperature of from about 650° C. to about 1075° C., the optimum calcining temperature being about 1000° C.

Figure 2:
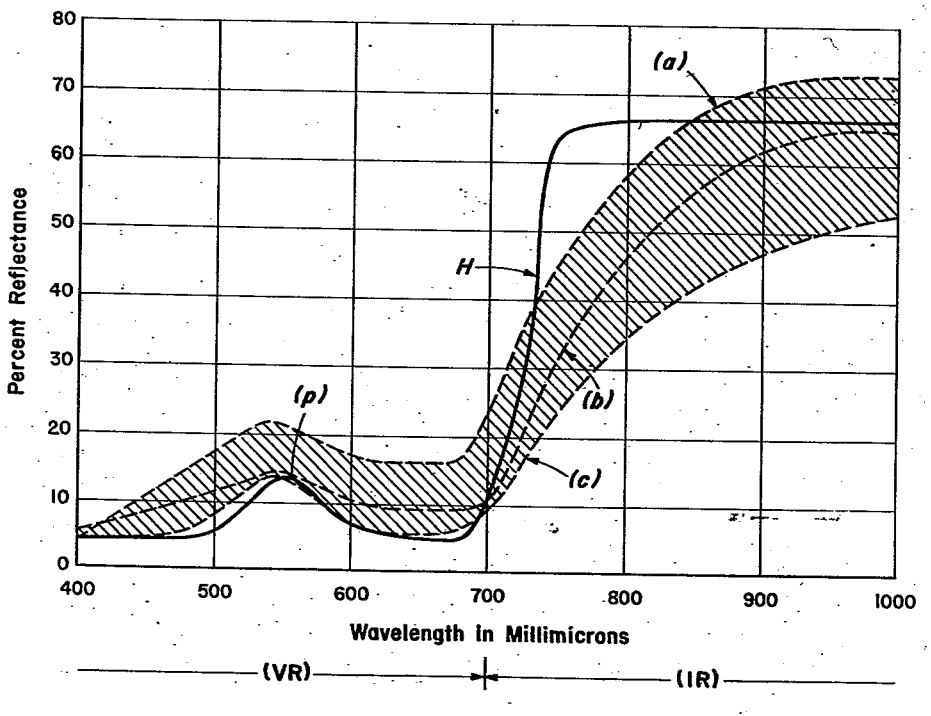

For visualizing the spectrophotometric characteristics of green pigments, made by the process of this invention, reference may be made to Figure 2, the shaded area of which is comprehensive of the spectrophotometric curves of any one of the improved green pigments within the scope of this invention and includes, for comparison, the spectrophotometric curve (H) of chlorophyll. By way of explanation, it will be seen that the graph covers the range of wave lengths from the lowest end of the visible range (VR) which corresponds to about 400 millimicrons thru a portion of the near infra-red range (IR) to a point corresponding to about 1000 millimicrons, the upper end of the visual range coinciding with the lower end of the near infra-red range at about 700 millimicrons.

The chlorophyll curve (H) is characterized by a relatively high peak reflectance value, sometimes hereinafter referred to as the green peak ($p$), at about 550 millimicrons, a minimum reflectance value at about 680 millimicrons and an extremely sharp rise in reflectance value from 680 microns to about 750 millimicrons.

The three curves ($a$), ($b$) and ($c$) within the shaded area of Figure 2 comprise pigment materials having the compositions hereinafter described and, as shown, each curve starts at the lowest end of the visible range at a percent reflectance value corresponding substantially to that of chlorophyll and rises rather sharply to a peak at about 550 millimicrons corresponding substantially to the green peak ($p$) of chlorophyll, the reflectance values of these curves being somewhat higher than that of chlorophyll. From its peak each curve falls off rather sharply and is substantially parallel to the corresponding slope of the chlorophyll curve to a point opposite about 600 millimicrons from which point each curve extends as a substantially flat line to a relatively low reflectance value at about 680 millimicrons. From 680 to 750 millimicrons each curve rises relatively sharply, closely approximating the sharp rise in reflectance value of the chlorophyll curve.

The calcination time has no appreciable effect upon the color of the pigment or its spectrophotometric curve but should generally be between ½ to 2 hours and preferably about 1 hour. Batches of dried material calcined under these preferred conditions are dark green in appearance, are soft and free from grit and hence are ideally suited for incorporation into paint vehicles for the formation of camouflage coating compositions.

Generally speaking, the proportions of the ingredients will influence, to some degree, the properties of the calcined green pigment. An increase in chromium oxide tends to shift the visible green peak of the spectrophotometric curve of the green pigment in the direction of the longer wave lengths, that is to say, from left to right as seen in Figure 2, and to produce a drop in the usual reflectance value at the green peak of the curve as well as in the infra-red reflectance value of the curve. On the other hand, an increase in the amount of cobaltous oxide tends to shift the green peak of the curve in the direction of shorter wave lengths and to decrease the visual reflectance value at the green peak of the curve, but to increase the infra-red reflectance value. As an example of the general effect on the properties of the pigment when the composition of the pigment is varied, the following table gives the tinting strength and oil absorption values of three typical green pigment compositions of this invention identified by the letters ($a$), ($b$) and ($c$).

| | Composition | | | Tinting Strength | Oil Absorption |
|---|---|---|---|---|---|
| | Cr₂O₃ | CoO | TiO₂ | | |
| (a) | 0.5 | 1 | 5 | 95 | 25 |
| (b) | 1 | 3 | 5 | 110 | 22 |
| (c) | 5 | 5 | 2 | 95 | 23 |

To further illustrate this invention, the following example is given:

Example I

To 1200 parts of a 25% solids hydrous titanium oxide as the source of titanium dioxide was added 187 parts of cobalt acetate tetrahydrate as the source of cobaltous oxide and 159 parts of chromic acid as the source of chromium sesquioxide. The ingredients were then vigorously agitated to insure an intimate mixture whereupon the slurry was dried. The dried material was then calcined in a muffle furnace at 100° C. for one hour. The calcined product was a soft dark green pigment which on analysis was found to comprise the following constituents:

64% titanium dioxide ($TiO_2$)
24% chromium oxide ($Cr_2O_3$)
12% cobaltous oxide (CoO)

To test the paint making properties of the pigment material, a camouflage paint was made using this green pigment material mixed with an alkyd vehicle at 2% PVC with 11% of a calcium carbonate extender. The paint was milled in a three roller paint mill and compared with a paint prepared in the same manner but using a standard chrome green ($Cr_2O_3$) pigment. It was noted that the hiding power of the camouflage paint was as good as and in some instances better than that of the chrome green paint.

A unique feature of the invention is the comparatively high titanium dioxide content which may be present in the green pigment without proportionate impairment of its dark green color or change in the infra-red reflectance value of the pigment. The amount of titanium dioxide may be substantially greater than that necessary to form mixed crystals of cobalt chromite and cobalt orthotitanate and this phenomenon suggests that a physical as well as a chemical combination of the ingredients occurs during calcination and that possibly the chemically uncombined titanium dioxide becomes coated with cobalt orthotitanate and/or cobalt chromite. In this connection an X-ray diffraction analysis was made of various mol ratio samples of the chromium sesquioxide, cobaltous oxide and titanium dioxide system in order to determine the mechanism of the solid state reaction between chromium oxide ($Cr_2O_3$), cobaltous oxide (CoO) and titanium dioxide ($TiO_2$). From the data obtained from an X-ray diffraction analysis of a sample pigment wherein the mol ratio of cobaltous oxide, chromium oxide and titanium dioxide is 3:1:5, it appears that the mechanism of the solid state reactions may be as follows:

(1) $CoO + Cr_2O_3 = CoCr_2O_4$
(2) $2CoO + 5TiO_2 = Co_2TiO_4 + 4TiO_2$

Apparently one mol of cobaltous oxide reacts with one mol of chromium oxide to form cobalt chromite. The remaining two mols of cobaltous oxide then react with five mols titanium dioxide to form cobalt orthotitanate. It is to be noted, however, that in the reaction between cobaltous oxide and titanium dioxide that there is an excess of titanium dioxide in the system. Heretofore, any mixture of cobalt and titanium in which titanium has been in excess of cobalt has formed cobalt metatitanate, and the only known method of forming cobalt orthotitanate has been by providing cobaltous oxide and titanium dioxide in the stoichiometric ratio of two to one. It is postulated, therefore, that the cobalt chromite formed in the first reaction has a crystal lattice structure which is isomorphous with that of cobalt orthotitanate and acts as a seed to catalyze the preferential formation of cobalt orthotitanate over cobalt metatitanate.

As pointed out above, the amount of titanium dioxide used in a mixture of chromic acid, cobalt acetate and hydrous titanium oxide may be in excess of that required to form mixed crystals of cobalt chromite and cobalt orthotitanate and it has been found that when there is a large excess of titanium dioxide, there will be free titanium dioxide in the final pigment, the amount over and above that which is combined with the mixed crystals of cobalt chromite and cobalt orthotitanate being present as a diluent or extender with some increase in the visual reflectance value of the green pigment. In this connection, it has been noted that when oxides of zinc and calcium are admixed with the chromium oxide, cobaltous oxide, titanium dioxide pigment series the spectrophotometric curves of the pigments are altered. The addition of the zinc oxide was found to produce a color trend towards yellow while the addition of calcium oxide had no appreciable effect on the color of the pigment but did tend to darken the color somewhat.

The novel green pigment of this invention has a spectrophotometric curve which corresponds closely to the spectrophotometric curve of chlorophyll and hence is ideally suited for use in the formation of camouflage coating compositions, the green pigment being readily incorporated in paint vehicles to produce a camouflage paint which has high hiding power, low oil absorption and good resistance to weathering.

It will be understood that the examples shown are given merely for the purpose of illustration and that other variations and embodiments may be considered to fall within the scope of this invention as limited by the appended claim.

We claim:

An antimony free cobalt chromite, cobalt orthotitanate pigment consisting essentially of chromium sesquioxide, cobaltous oxide and titanium dioxide in physico-chemical combination, the amounts of chromium sesquioxide, cobaltous oxide and titanium dioxide analytically present being in such proportions by weight as may be represented by a point lying within the area of a triangular diagram of composition chromium sesquioxide, cobaltous oxide and titanium dioxide defined as bounded by straight lines joining a series of points represented by the compositions:

| Points | Parts by Weight | | |
|---|---|---|---|
| | $Cr_2O_3$ | CoO | $TiO_2$ |
| | Percent | Percent | Percent |
| A | 65 | 1 | 34 |
| B | 65 | 23 | 12 |
| C | 48 | 40 | 12 |
| D | 16 | 40 | 44 |
| E | 6 | 15 | 79 |
| F | 6 | 4 | 90 |
| G | 9 | 1 | 90 |

References Cited in the file of this patent

UNITED STATES PATENTS

| | | |
|---|---|---|
| 1,891,210 | Wolff | Dec. 13, 1932 |
| 1,945,809 | Harbert | Feb. 6, 1934 |
| 2,213,168 | Monk et al. | Aug. 27, 1940 |